(No Model.)
L. F. TEBEL.
ELEVATOR LOCK.
No. 425,268. Patented Apr. 8, 1890.
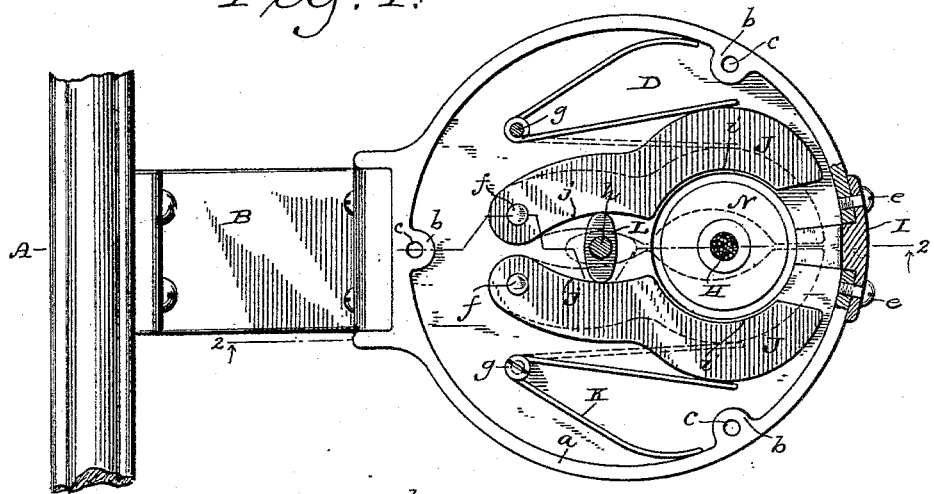
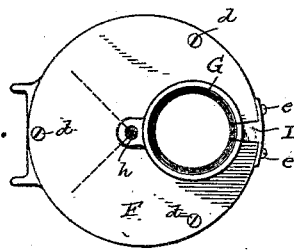
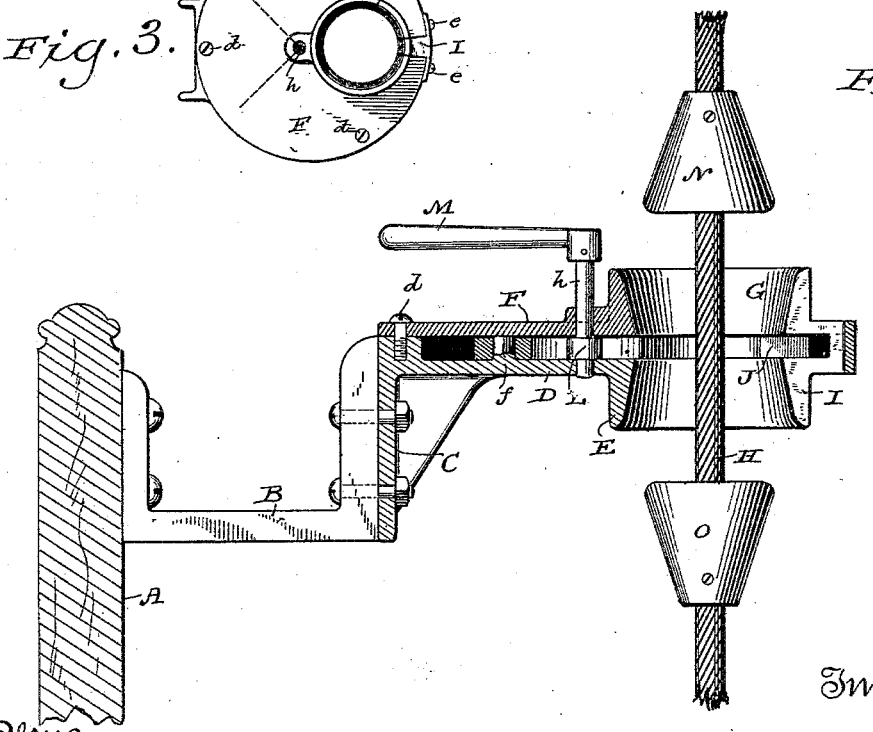
Witnesses
Geo. W. Young
Wm Klug
Inventor
Louis F. Tebel
By Flint & Underwood
Attorneys

UNITED STATES PATENT OFFICE.

LOUIS F. TEBEL, OF MILWAUKEE, WISCONSIN.

ELEVATOR-LOCK.

SPECIFICATION forming part of Letters Patent No. 425,268, dated April 8, 1890.

Application filed November 13, 1889. Serial No. 330,140. (No model.)

*To all whom it may concern:*

Be it known that I, LOUIS F. TEBEL, of Milwaukee, in the county of Milwaukee, and in the State of Wisconsin, have invented certain new and useful Improvements in Elevator-Locks; and I do hereby declare that the following is a full, clear, and exact description thereof.

My invention relates to elevator-locks; and it consists in certain peculiarities of construction, as will be fully set forth hereinafter and subsequently claimed.

In the drawings, Figure 1 is a plan view of my device with parts broken away and the casing or cover removed. Fig. 2 is a vertical section on the line 2 2 of Fig. 1, and Fig. 3 is a plan view of the casing or cover.

My present invention is an improvement, in part, on the device shown in the patent of James S. Ashton, No. 331,672, granted December 1, 1885, and the construction of my casing, flanged guiding-cups, and conical stops on the cable does not differ materially from that shown in said patent, my arrangement of spring-pressed leaves and means of simultaneously operating them being entirely different and constituting the principal improvement over said patent.

A represents a portion of an elevator-car, and B a flange projecting therefrom, to the end of which is bolted a flange C on the lower plate D of the elevator-lock, having the downwardly-projecting guiding-cup E, with inclined inner wall, forming a conical opening, the said lower plate D having a circumferential flange *a* on its upper side, provided with bosses *b* at intervals, having vertical screw-threaded bores *c* cut therein, and the casing or upper plate F of the lock rests on said flange *a* and is secured thereto by screws *d*, which pass through holes in said casing and into the described bores *c*, and said casing is provided with the upwardly-projecting guiding-cup G, having inclined inner wall, forming an inverted conical opening, the opposite or counterpart of the opening through cup E below, and the casing and its cup, as well as the lower part of the lock and its cup, being cut out or through at one side to admit of the passage therethrough of the cable H, which connects with the valve or other mechanism for starting or stopping the elevator in putting the parts together, there being a plug or back piece I fitting in said cut out place, of the shape shown in Figs. 1 and 2, secured by screws *e e*, as shown. In the space between the casing and lower plate of the lock are located the locking-leaves J J, pivoted as shown at *f f*, and the side springs K K, secured as shown at *g g*, one end of each of said springs K bearing against the flange *a* of the lower plate D of the lock, and the other end of said spring bearing against one of the leaves J, the normal tendency of said springs being to force the free ends of said locking-leaves J J together, as shown in dotted lines in Fig. 1, and thereby close the opening between the cups G E; but when desired said leaves may be kept apart by the cam L, which is pivoted between said leaves, near their pivoted ends, on a vertical shaft *h*, (to which said cam is fast,) having a lever-handle M for convenient manipulation. The cable H is provided with two conical stops N O, secured thereto with one of said stops in an inverted position, as shown in Fig. 2.

The preferred shape of the locking-leaves J is that shown in Fig. 1, having near their free ends concavities *i*, corresponding to the openings in the cups G E, and near their pivoted ends other concavities *j*, to receive the cam L when it is turned lengthwise, as shown in dotted lines in Fig. 1.

The operation of my device will be readily understood from the foregoing description of its construction. When it is desired to allow the elevator to pass uninterruptedly up or down the entire distance, the cam L is turned as shown in full lines in Fig. 1, which forces the inner front opposing edges of the locking-leaves back in line with the walls of the openings of the said cups, and hence there is no obstruction to the free passage of the stops N O on the cable H through the openings in the cups G E; but when it is desired to stop the elevator at any stage the cam L is turned to the position shown in dotted lines in said Fig. 1, when the springs K will instantly and automatically force the front ends of said leaves J together, closing said space between the cups, as also shown in dotted lines in said figure, and then when the cable H is pulled either up or down, as the case may be, as the pointed end of one of the conical stops on the cable reaches this point it will force said leaves apart against the pressure of the springs, permitting that stop to pass through, but the base end of the next conical stop will next come against said leaves, and hence will not be able to open them, and the movement of the elevator is instantly arrested, and it is held stationary at that point until the lever M is moved to turn the cam L again to the position shown in full lines in the drawings, thereby again opening the passage between the two cups G E.

Having thus described my invention, what I claim as new, and desire to secure by Letters Patent, is—

In an elevator-lock, the combination, with the lower plate having a circumferential flange and an upper plate or casing resting on and secured to said flange, both plates having registering openings, with flanges or guiding-cups having conical inner walls projecting in opposite directions from the walls of said openings, of a pair of locking-leaves pivoted in the space between said plates and having opposing concavities conforming in shape to said openings near their free ends, and other opposing concavities near their pivoted ends, a pair of double or V-shaped springs having two free ends and secured at their apexes directly to and between said plates and bearing against said flange and said leaves, a cam pivoted between the concavities near the pivoted ends of said leaves on a shaft extending through said plates, a lever-handle on said shaft, and a cable passing through the said openings in the plates and provided with oppositely-faced conical stops, substantially as set forth.

In testimony that I claim the foregoing I have hereunto set my hand, at Milwaukee, in the county of Milwaukee and State of Wisconsin, in the presence of two witnesses.

LOUIS F. TEBEL.

Witnesses:
H. G. UNDERWOOD,
WM. KLUG.